Feb. 12, 1935.   W. R. C. ASHBY   1,990,580
APPLIANCE FOR USE DURING THE COOKING OF CHICKENS AND OTHER BIRDS
Filed Nov. 22, 1933
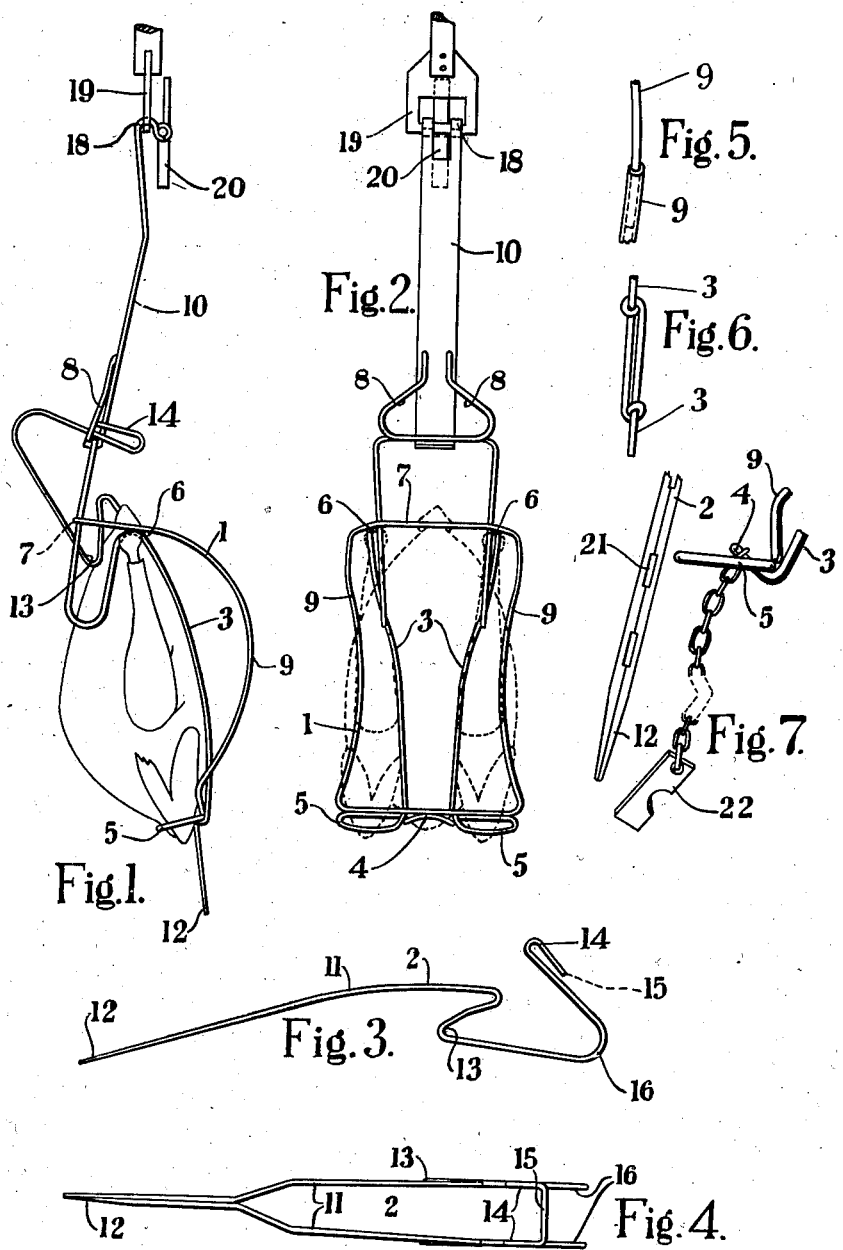
Inventor
W. R. C. Ashby
by
atty.

Patented Feb. 12, 1935

1,990,580

UNITED STATES PATENT OFFICE 1,990,580

APPLIANCE FOR USE DURING THE COOKING OF CHICKENS AND OTHER BIRDS

William Ross Chamberlin Ashby, Ightham, England

Application November 22, 1933, Serial No. 699,258
In Great Britain December 3, 1932

9 Claims. (Cl. 17—11)

The invention relates to means for retaining the carcasses of chickens or other birds in a trussed form during cooking or like operations, for example, in operations preparatory to canning as described in the specification of an application No. 699,260 filed by me of even date herewith.

The object of the invention is to enable the carcass of a chicken or other bird to be held during treatment in a trussed condition, without the use of the usual skewers or string ties, and preferably in an upright or end-on position, and, when desired, to facilitate the conveyance of the bird in this form, for example, to, through and from cooking apparatus, or apparatus for treating the carcass preparatory to canning.

According to the invention, a truss-frame comprises two main parts, one adapted to be inserted in the carcass of the bird to engage with the spine and support the carcass from the inside and another adapted to support the carcass from the outside and having means engaging with the legs and wings so as to hold them in the trussed condition. These two parts are preferably arranged to interlock, so as to prevent the bird falling out of the truss-frame.

In the accompanying drawing:

Figure 1 illustrates, in side view, one form of truss-frame according to the invention, with a carcass in position.

Figure 2 is a rear view of the cage only, the locking bar being omitted and the carcass only being indicated by dotted lines.

Figures 3 and 4 are two views of the locking bar.

Figures 5 and 6 are detail views of telescopic wires forming parts of an adjustable cage.

Figure 7 is a detail of a locking device for a locking bar.

In the example illustrated, the truss-frame comprises two parts 1 and 2 conveniently termed the "cage" and the "locking bar", respectively.

The cage 1, which supports the carcass of the bird from the outside and holds the legs and wings in the proper trussed positions, comprises two wires 3, 3 for supporting the back of the carcass, a lower central loop 4 to receive the neck end of the carcass, two lower loops 5, 5 to receive the wing bones and two upper loops 6, 6 to receive and engage with the grooved knuckle bones or hocks to hold the legs in the proper position.

It may be provided with a hinged or removable wire to cross over the breast or other part of the carcass for further security.

The cage 1 also has a crossbar 7, loops 8, 8, stiffening wires and guards 9 and a handle 10.

When the carcass is inserted in the cage 1 with the legs and wings held in the proper positions, the locking bar 2 is inserted in the bird and interlocked with the cage.

It comprises a tapering portion 11 which is shaped to conform approximately to the spine of the carcass so as to engage therewith and support the carcass from inside. It has a lower pointed portion 12. It has two loops 13, 13 for co-operation with the cross bar 7 of the cage 1, and at its upper end has two loops 14, 14 which enter the loops 8, 8 of the cage 1, the loops 14, 14 being connected by a bar 15.

The loops 13, 13 and 14, 14 are connected by portions 16, 16 which act as springs to enable the loops 14, 14 to be sprung into and out of the loops 8, 8.

When the locking bar 2 is inserted in the carcass, its pointed end 12 protrudes therefrom and passes through the lower loop 4, and the locking bar is pressed downwardly sufficiently to allow the loops 13, 13 to be brought behind the cross bar 7, whereupon the operator, by pulling on the bar 15, can spring the loops 14, 14 into the loops 8, 8, the bar 15 then resting against the plate or handle 10. The locking bar is thus locked to the cage and accidental removal of it and of the carcass is prevented. This is important when the cage is suspended from a conveyor. In such a case, the handle 10 is provided with a hook 18 for engagement with a stirrup, such as 19, on the conveyor.

The hook 18 is provided with a pivoted pawl 20 which is so weighted that when the hook 18 is passed through the stirrup 19, the pawl moves automatically into an upright position and locks the hook on the stirrup.

The hook can be attached to the stirrup by first inserting the weighted end of the pawl 20 into the stirrup until the hook 18 engages with the stirrup bar, then swinging the handle upwardly about the stirrup bar until it and the thinner end of the pawl can be moved through the stirrup 19, when the handle can be swung down until the hook rests on the stirrup bar and the pawl will automatically assume the locking position shown in Figure 1 of the drawing.

When the cage is to be free to swing in one direction only, for instance, opposite to that of the direction of travel of the conveyor, the stirrup acts as a stop for the adjacent part of the handle 10.

The trussing-frame provided with a suspension as above described is particularly suitable for use in apparatus such as described in the specification of application No. 699,260 filed simultaneously herewith, wherein the cages have to meet obstructions, such as trap doors and chutes, when passing into and out of cooking and washing appliances, the guards 9, 9, which bulge beyond the wires 3, 3 then striking and sliding on these parts and protecting the carcass.

The locking pawl avoids accidental removal of the cage under these conditions, whereas it enables the operators quickly to attach and detach the cage to and from the conveyor, when required.

In order that the cage may be adjusted to receive carcasses of different sizes, the wires 3, 3 and the guards 9, 9 may be made telescopic, as indicated in Figures 5 and 6. In such a case, each locking-bar may be adapted to lock the cage after adjustment, for example, its lower end may have a series of holes 21 to receive a linch pin or cotter pin 22, as indicated in Figure 7. Locking bars of different length to suit these adjustments may be used.

The invention is not limited to a wire-work cage so long as it is provided with means for engaging with the carcass and the legs and wings to hold them in trussed position, as above described, and not in contact with any extensive surface likely to interfere with the cooking or treatment in oil.

I claim:

1. A truss-frame for retaining the carcass of a chicken or other bird in trussed condition during cooking, or other treatment preparatory to canning, comprising two main parts, one adapted to be inserted in the carcass to support the same from the inside and another adapted to support the carcass from the outside and having means for engaging with the legs and wings so as to hold them in the trussed condition, the part of the truss-frame which is inserted in the carcass having means for interlocking it with the other part of the truss-frame, when the carcass is in said frame.

2. A truss-frame for retaining the carcass of a chicken or other bird in trussed condition, comprising a wire cage for receiving the carcass of the bird and having means for engaging with the legs and wing bones of the carcass, and a locking bar adapted to be inserted in the carcass when in said cage and to interlock with said cage.

3. A truss-frame for retaining the carcass of a chicken or other bird in trussed condition, comprising a cage for receiving the carcass of the bird and having means for engaging with the legs and wing bones of the carcass, a locking bar adapted to be inserted in the carcass when in said cage and to interlock with said cage, and suspension means on said truss frame.

4. A truss-frame for retaining the carcass of a chicken or other bird in trussed condition during cooking, comprising a wire cage for receiving the carcass of the bird and having upper loops for engaging with the knuckle-bones of the legs and having lower loops to receive the wing bones and neck end of the carcass and means for locking the carcass in said cage.

5. A truss-frame for retaining the carcass of a chicken or other bird in trussed condition during cooking, comprising a wire cage for receiving the carcass of the bird and having upper loops for engaging with the knuckle-bones of the legs and having lower loops to receive the wing bones and neck end of the carcass and a locking bar for locking the carcass in said cage and comprising a tapered and pointed portion and loops for interlocking with the upper part of the cage.

6. A truss-frame for retaining the carcass of a chicken or other bird in trussed condition, comprising a wire cage having wires for supporting the back of the carcass, lower loops for the reception of the wing-bones and neck end of the carcass and upper loops for receiving the knuckle bones of the legs of the carcass, said back supporting wires being intermediate of said upper and lower loops and being telescopic, substantially as and for the purposes hereinbefore set forth.

7. A truss-frame for retaining the carcass of a chicken or other bird, comprising a wire cage having upper and lower loops for the reception of the knuckle bones of the legs and for the wing-bones and neck end of the carcass, respectively, wires for supporting the back of the carcass and other wires bulging beyond said back supporting wires to guard the carcass and a locking bar for securing the carcass in said cage.

8. A truss-frame for retaining the carcass of a fowl or other bird, comprising a cage and means for securing the carcass of the bird within the cage, said frame being adapted to be supported on a supporting stirrup, an element forming an extension of the cage and having an end formed for passage through said stirrup, and a pawl carried by said end, said pawl being freely movable through the stirrup and automatically assuming a position beyond the stirrup to prevent casual disconnection of the stirrup and cage.

9. A truss frame for retaining the carcass of a chicken or other bird, including a cage to receive the carcass, an extension from the cage, the free end of the extension being formed to provide a hook, said frame being adapted to be supported on a conveyor stirrup designed to receive the hook and swingingly support the cage, and a gravity-operated latch carried by the hooked end of the extension, said latch being freely movable through the stirrup in one direction and automatically assuming a position beyond the stirrup to prevent casual return movement, whereby the cage is movably supported from the stirrup and prevented from casual disconnection therefrom.

WILLIAM ROSS CHAMBERLIN ASHBY.